US012105265B2

(12) United States Patent
Teranishi

(10) Patent No.: US 12,105,265 B2
(45) Date of Patent: Oct. 1, 2024

(54) CAMERA OPTICAL LENS

(71) Applicant: AAC Optics (Nanning) Co., Ltd., Nanning (CN)

(72) Inventor: Takaaki Teranishi, Osaka (JP)

(73) Assignee: AAC Optics (Nanning) Co., Ltd., Nanning (CN)

( * ) Notice: Subject to any disclaimer, the term of this patent is extended or adjusted under 35 U.S.C. 154(b) by 513 days.

(21) Appl. No.: 17/562,999

(22) Filed: Dec. 27, 2021

(65) Prior Publication Data

US 2023/0194836 A1 Jun. 22, 2023

(30) Foreign Application Priority Data

Dec. 17, 2021 (JP) .................... 2021-205500

(51) Int. Cl.
*G02B 13/00* (2006.01)
*G02B 9/64* (2006.01)
(52) U.S. Cl.
CPC ........... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS

| | | | | |
|---|---|---|---|---|
| 2006/0274433 A1* | 12/2006 | Kamo | ............... | G02B 13/0095 359/793 |
| 2019/0219795 A1* | 7/2019 | Chen | ........................ | G02B 9/62 |
| 2019/0324232 A1* | 10/2019 | Yang | ........................ | G02B 9/64 |
| 2020/0142158 A1* | 5/2020 | Yao | ........................ | G02B 13/04 |

* cited by examiner

*Primary Examiner* — Ephrem Z Mebrahtu
(74) *Attorney, Agent, or Firm* — W&G Law Group

(57) ABSTRACT

The present disclosure relates to a field of optical lens, and provides a camera optical lens including, from an object side to an image side in sequence, a first lens having negative refractive power, a second lens having negative refractive power, a third lens having negative refractive power, a fourth lens having positive refractive power, a fifth lens having negative refractive power, a sixth lens having positive refractive power and a seventh lens having positive refractive power; where the camera optical lens satisfies conditions of: $-50.10 \leq f2/f \leq -22.90$; $9.20 \leq d2/d4 \leq 30.00$; and $-11.10 \leq R5/f \leq -9.55$.

6 Claims, 6 Drawing Sheets

CAMERA OPTICAL LENS

TECHNICAL FIELD

The present disclosure relates to a camera optical lens, particular, to a camera optical lens which is suitable for a surround-sensing camera using imaging elements such as Charge Coupled Device (CCD) or Complementary Metal-Oxide Semiconductor Sensor (CMOS sensor) for high pixel, etc., and which has a suitable field angle and excellent optical performance, and includes seven bright lenses with a F number (FNO) less than 1.83.

BACKGROUND

In recent years, high accuracy of image recognition of objects (surrounding vehicles, obstacles, road signs, and the like) by a surround-sensing camera is required for automatic driving. Therefore, in order to improve the accuracy of image recognition, it is a tendency to increase the size and the resolution of the sensor. In addition, in order to improve night recognition performance, a camera optical lens with a brighter FNO is required.

A camera optical lens with good optical performance is disclosed in embodiments of Japanese Patent Publication No. 2006-337691. The camera optical lens has a first lens having a negative refractive power, a second lens having a negative refractive power, a third lens having a negative refractive power, a fourth lens having a positive refractive power, and a fifth lens having a negative refractive power, a sixth lens having a positive refractive power and a seventh lens having a positive refractive power. However, due to insufficient relationships between the focal length of the second lens and the focal length of the camera optical lens, between the on-axis distance from the image-side surface of the first lens to the object-side surface of the second lens and the on-axis distance from the image-side surface of the second lens to the object-side surface of the third lens, and between the central curvature radius of the object-side surface of the third lens and the focal length of the camera optical lens, the camera optical lens becomes dark when the FNO is 2.40.

SUMMARY

An object of the present disclosure is to provide a camera optical lens having excellent optical performance, and including seven lenses with a bright FNO.

In order to achieve that aforementioned object, the present disclosure is conceived with a camera optical lens capable of solving the problem in the existing technology, by studying a camera optical lens including, from an object side to an image side in sequence, a first lens having negative refractive power, a second lens having negative refractive power, a third lens having negative refractive power, a fourth lens having positive refractive power, and a fifth lens having negative refractive power, a sixth lens having positive refractive power and a seventh lens having positive refractive power, as well as relationships between a focal length of the second lens and a focal length of the camera optical lens, between an on-axis distance between an image-side surface of the first lens and an object-side surface of the second lens and an on-axis distance between an image-side surface of the second lens and an object-side of the third lens, between a central curvature radius of an object-side surface of the third lens and the focal length of the camera optical lens.

Embodiments of the present disclosure provide a camera optical lens. The camera optical lens includes, from an object side to an image side in sequence, a first lens having negative refractive power, a second lens having negative refractive power, a third lens having negative refractive power, a fourth lens having positive refractive power, a fifth lens having negative refractive power, a sixth lens having positive refractive power and a seventh lens having positive refractive power; wherein the camera optical lens satisfies conditions of: $-50.10 \leq f2/f \leq -22.90$; $9.20 \leq d2/d4 \leq 30.00$; and $-11.10 \leq R5/f \leq -9.55$; where f denotes a focal length of the camera optical lens; f2 denotes a focal length of the second lens; R5 denotes a central curvature radius of an object-side surface of the third lens; d2 denotes an on-axis distance from an image-side surface of the first lens to an object-side surface of the second lens; and d4 denotes an on-axis distance from the image-side surface of the second lens to the object-side surface of the third lens.

As an improvement, the camera optical lens further satisfies a condition of: $-753.70 \leq f2/d4 \leq -109.00$, where; f2 denotes a focal length of the second lens; and d4 denotes an on-axis distance from the image-side surface of the second lens to the object-side surface of the third lens.

As an improvement, the camera optical lens further satisfies a condition of: $4.60 \leq f2/R4 \leq 14.60$; where f2 denotes a focal length of the second lens; and R4 denotes a central curvature radius of an image-side surface of the second lens.

As an improvement, the camera optical lens further satisfies a condition of: $-25.00 \leq f2/f6 \leq -12.00$; where f2 denotes a focal length of the second lens; and f6 denotes a focal length of the sixth lens.

As an improvement, the first lens, the second lens, the third lens, the fourth lens, the fifth lens, the sixth lens and the seventh lens having positive refractive power are made from glass material.

As an improvement, each of the second lens and the seventh lens is an aspheric glass lens.

The present disclosure is advantageous in follows.

According to the present disclosure, the camera optical lens is provided, which is suitable for a surround-sensing camera using imaging elements such as Charge Coupled Device (CCD) or Complementary Metal-Oxide Semiconductor Sensor (CMOS sensor) for high pixel, etc., and which has a suitable field angle and excellent optical performance, and includes seven bright lenses with a bright FNO.

BRIEF DESCRIPTION OF DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF EMBODIMENTS

Figure 1:
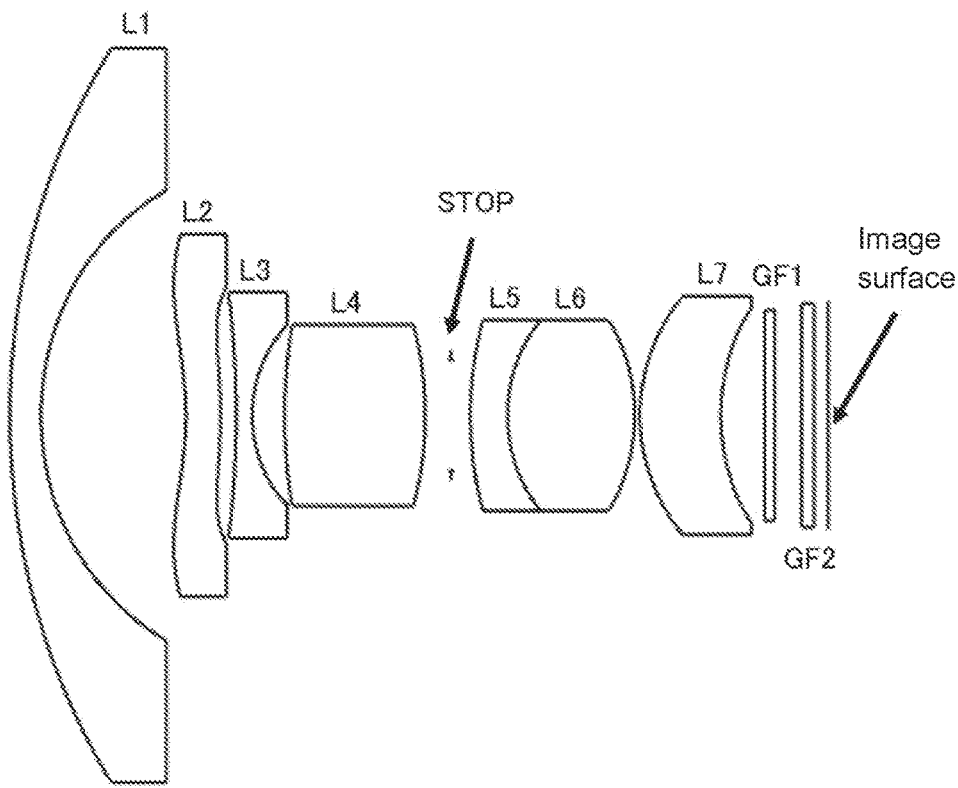
FIG. 1 is a schematic diagram of a structure of a camera optical lens LA according to Embodiment 1 of the present disclosure.

The present disclosure will be further described with reference to the accompanying drawings and embodiments. To make the objects, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

Embodiments of the camera optical lens will be described herein. The camera optical lens LA has a lens system including seven lenses, in which, from the object side to the image side in sequence, a first lens L1, a second lens L2, a third lens L3, a fourth lens L4, a fifth lens L5, a sixth lens L6 and a seventh lens L7 are provided. Glass plates GF are disposed between the seventh lens L7 and an image surface. The glass plates GF may include glass cover plates, various filters, and the like. In the present disclosure, the glass plates GF may be disposed at different positions or may be omitted. In addition, the first lens L1, the second lens L2, the third lens L3, the fourth lens L4, the fifth lens L5, the sixth lens L6 and the seventh lens L7 are also made from glass material.

The first lens L1 has a negative refractive power, the second lens L2 has a negative refractive power, the third lens L3 has a negative refractive power, the fourth lens L4 has a positive refractive power, the fifth lens L5 has a negative refractive power, the sixth lens L6 has a positive refractive power, and the seventh lens L7 has a positive refractive power. For batter correction to various distortions, it is desirable that surfaces of the second lens L2 and the seventh lens L7 are aspheric.

The camera optical lens LA satisfies a condition of:

$$-50.10 \leq f2/f \leq -22.90 \tag{1}$$

Condition (1) specifies a ratio of a focal length f2 of the second lens L2 to a focal length f of the camera optical lens LA. Within this condition, correction to various distortions is facilitated when the FNO is 1.83.

The camera optical lens LA satisfies a condition of:

$$9.20 \leq d2/d4 \leq 30.00 \tag{2}$$

Condition (2) specifies a ratio of an on-axis distance d2 from an image-side surface S2 of the first lens L1 to an object-side surface S3 of the second lens L2 to an on-axis distance d4 from the image-side surface S4 of the second lens L2 to the object-side surface S5 of the third lens L3. Within this condition, correction to various distortions is facilitated when the FNO is 1.83.

The camera optical lens LA satisfies a condition of:

$$-11.10 \leq R5/f \leq -9.55 \tag{3}$$

Condition (3) specifies a ratio of a central curvature radius R5 of an object-side surface S5 of the third lens L3 to the focal length f of the camera optical lens LA. Within this condition, correction to various distortions is facilitated when the FNO is 1.83.

The camera optical lens LA satisfies a condition of:

$$-753.70 \leq f2/d4 \leq -109.00 \tag{4}$$

Condition (4) specifies a ratio of the focal length f2 of the second lens L2 to the on-axis distance d4 from the image-side surface S4 of the second lens L2 to the object-side surface S5 of the third lens L3. Within this condition, correction to various distortions is facilitated when the FNO is 1.83.

The camera optical lens LA satisfies a condition of:

$$4.60 \leq f2/R4 \leq 14.60 \tag{5}$$

Condition (5) specifies a ratio of the focal length f2 of the second lens L2 to a central curvature radius R4 of an image-side surface S4 of the second lens L2. Within this condition, correction to various distortions is facilitated when the FNO is 1.83.

The camera optical lens LA satisfies a condition of:

$$-25.00 \leq f2/f6 \leq -12.00 \tag{6}$$

Condition (6) specifies a ratio of the focal length f2 of the second lens L2 to a focal length f6 of the sixth lens L6. Within this condition, correction to various distortions is facilitated when the FNO is 1.83.

With the seven lenses included in the camera optical lens LA satisfying the aforementioned structure and conditions respectively, the camera optical lens LA is obtained which is suitable for a surround-sensing camera, has a suitable field angle and excellent optical performance and has a FNO less than 1.83.

EMBODIMENTS

The camera optical lens LA will be further described with reference to the following examples. Symbols used in various examples are shown as follows. It should be noted that the distance, central curvature radius, and on-axis thickness are all in units of millimeter (mm).

f: focal length of the camera optical lens LA;
f1: focal length of the first lens L1;
f2: focal length of the second lens L2;
f3: focal length of the third lens L3;
f4: focal length of the fourth lens L4;
f5: focal length of the fifth lens L5;

f6: focal length of the sixth lens L6;
f7: focal length of the seventh lens L7;
FNO: F number (ratio of an effective focal length and an entrance pupil diameter of the camera optical lens);
2ω: full viewing angle;
STOP: aperture;
R: central curvature radius of an optical surface;
R1: central curvature radius of the object-side surface S1 of the first lens L1;
R2: central curvature radius of the image-side surface S2 of the first lens L1;
R3: central curvature radius of the object-side surface S3 of the second lens L2;
R4: central curvature radius of the image-side surface S4 of the second lens L2;
R5: central curvature radius of the object-side surface S5 of the third lens L3;
R6: central curvature radius of the image-side surface S6 of the third lens L3;
R7: central curvature radius of the object-side surface S7 of the fourth lens L4;
R8: central curvature radius of the image-side surface S8 of the fourth lens L4;
R9: central curvature radius of the object-side surface S9 of the fifth lens L5;
R10: central curvature radius of the image-side surface S10 of the fifth lens L5 and central curvature radius of the object-side surface S10 of the sixth lens L6;
R11: central curvature radius of the image-side surface S11 of the sixth lens L6;
R12: central curvature radius of the object-side surface S12 of the seventh lens L7;
R13: central curvature radius of the image-side surface S13 of the seventh lens L7;
R14: central curvature radius of an object-side surface S14 of the glass plate GF1;
R15: central curvature radius of an image-side surface S15 of the glass plate GF1;
R16: central curvature radius of an object-side surface S16 of the glass plate GF2;
R17: central curvature radius of an image-side surface 5157 of the glass plate GF2;
d: on-axis thickness of a lens or an on-axis distance between lenses;
d1: on-axis thickness of the first lens L1;
d2: on-axis distance from the image-side surface S2 of the first lens L1 to the object-side surface S3 of the second lens L2;
d3: on-axis thickness of the second lens L2;
d4: on-axis distance from the image-side S4 surface of the second lens L2 to the object-side surface S5 of the third lens L3;
d5: on-axis thickness of the third lens L3;
d6: on-axis distance from the image-side surface S6 of the third lens L3 to the object-side surface S7 of the fourth lens L4;
d7: on-axis thickness of the fourth lens L4;
d8: on-axis distance from the image-side surface S8 of the fourth lens L4 to the aperture STOP;
d9: on-axis distance from the aperture STOP to the object-side surface S9 of the fifth lens L5;
d10: on-axis thickness of the fifth lens L5;
d11: on-axis thickness of the sixth lens L6;
d12: on-axis distance from the image-side surface S11 of the sixth lens L6 to the object-side surface S12 of the seventh lens L7;
d13: on-axis thickness of the seventh lens L7;
d14: on-axis distance from the image-side surface S13 of the seventh lens L7 to the object-side surface S14 of the glass plate GF1;
d15: on-axis thickness of the glass plate GF1;
d16: on-axis distance from the image-side surface S15 of the glass plate GF1 to the object-side surface S16 of the glass plate GF2;
d17: on-axis thickness of the glass plate GF2;
d18: on-axis distance from the image-side surface S17 of the glass plate GF2 to the image surface;
nd: refractive index of the d line;
nd1: refractive index of the d line of the first lens L1;
nd2: refractive index of the d line of the second lens L2;
nd3: refractive index of the d line of the third lens L3;
nd4: refractive index of the d line of the fourth lens L4;
nd5: refractive index of the d line of the fifth lens L5;
nd6: refractive index of the d line of the sixth lens L6;
nd7: refractive index of the d line of the seventh lens L7;
nd8: refractive index of the d line of the glass plate GF1;
nd9: refractive index of the d line of the glass plate GF2;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
v7: abbe number of the seventh lens L7;
v8: abbe number of the glass plate GF1;
v9: abbe number of the glass plate GF2;
TTL: total optical length of the camera optical lens (on-axis distance from the object-side surface S1 of the first lens L1 to the image surface of the camera optical lens) in mm;
LB: on-axis distance from the image-side surface S13 of the seventh lens L7 to the image surface (including the thicknesses of the glass plates GF);
IH: image high.

Embodiment 1

FIG. 1 is a schematic diagram of a structure of the camera optical lens LA according to Embodiment 1 of the present disclosure. Table 1 shows the central curvature radiuses R of the object-side surfaces and the image-side surfaces of the camera optical lens LA of the first lens L1 to the seventh lens L7, the on-axis thicknesses d of the lenses, the on-axis distances d between the lenses, the refractive indexes nd and the abbe numbers vd. Table 2 shows the conic coefficients k and the aspheric surface coefficients. Table 3 shows values of 2ω, Fno, f, f1, f2, f3, f4, f5, f6, f7, TTL, LB and IH.

TABLE 1

|    |    | R | d | nd | vd | Effective radius (mm) |
|----|----|---|---|----|----|----|
| S1 | R1 | 23.14014 | d1 1.218 | nd1 1.6510 | v1 56.24 | 12.943 |
| S2 | R2 | 8.89087  | d2 5.659 |     |     | 7.934 |

TABLE 1-continued

|  |  | R | d | nd | vd | Effective radius (mm) |
|---|---|---|---|---|---|---|
| S3 | R3 | −10.00610 | d3 1.358 | nd2 1.5831 | v2 59.37 | 6.405 |
| S4 | R4 | −14.15104 | d4 0.609 | | | 4.527 |
| S5 | R5 | −31.25937 | d5 0.629 | nd3 1.6180 | v3 63.32 | 4.339 |
| S6 | R6 | 4.37867 | d6 1.269 | | | 3.191 |
| S7 | R7 | 17.92240 | d7 5.499 | nd4 1.8081 | v4 22.76 | 3.185 |
| S8 | R8 | −11.05510 | d8 1.014 | | | 2.547 |
| STOP | STOP | ∞(Infinity) | d9 0.748 | | | 1.962 |
| S9 | R9 | 11.77016 | d10 1.450 | nd5 1.9591 | v5 17.47 | 2.324 |
| S10 | R10 | 4.99876 | d11 4.977 | nd6 1.5952 | v6 67.74 | 2.463 |
| S11 | R11 | −6.05390 | d12 0.199 | | | 3.347 |
| S12 | R12 | 5.62000 | d13 3.170 | nd7 1.5831 | v7 59.37 | 4.030 |
| S13 | R13 | 6.67583 | d14 1.702 | | | 3.576 |
| S14 | R14 | ∞ | d15 0.400 | nd8 1.5168 | v8 64.20 | 3.681 |
| S15 | R15 | ∞ | d16 1.056 | | | 3.723 |
| S16 | R16 | ∞ | d17 0.500 | nd9 1.5168 | v9 64.20 | 3.891 |
| S17 | R17 | ∞ | d18 0.550 | | | 3.944 |

Reference wavelength = 588 nm

TABLE 2

| | Conic coefficient | Aspheric surface coefficients | | | |
|---|---|---|---|---|---|
| | k | A4 | A6 | A8 | A10 |
| R3 | 0.0000000E+00 | 1.7141842E−03 | −1.4200034E−05 | 7.4274515E−08 | 0.0000000E+00 |
| R4 | 0.0000000E+00 | 2.1344431E−03 | −1.0922261E−05 | 8.6787095E−07 | 5.7317018E−09 |
| R12 | 4.8210538E−02 | −8.0277970E−04 | 2.8586590E−06 | 9.3417374E−08 | −6.1986286E−09 |
| R13 | 4.1523018E−01 | −4.8611796E−04 | −1.1959800E−06 | 5.0440347E−08 | 9.9641583E−08 |

| | Conic coefficient | Aspheric surface coefficients | | |
|---|---|---|---|---|
| | k | A12 | A14 | A16 |
| R3 | 0.0000000E+00 | 0.0000000E+00 | 0.0000000E+00 | 0.0000000E+00 |
| R4 | 0.0000000E+00 | 0.0000000E+00 | 0.0000000E+00 | 0.0000000E+00 |
| R12 | 4.8210538E−02 | 0.0000000E+00 | 0.0000000E+00 | 0.0000000E+00 |
| R13 | 4.1523018E−01 | 0.0000000E+00 | 0.0000000E+00 | 0.0000000E+00 |

Herein, k denotes a conic coefficient, A4, A6, A8, A10, A12, A14 and A16 denote aspheric surface coefficients.

$$y=(x^2/R)/[1+\{1-(k+1)(x^2/R^2)\}^{1/2}]+A4x^4+A6x^6+A8x^8+A10x^{10}+A12x^{12}+A14x^{14}+A66x^{16} \quad (7)$$

Herein, x denotes a vertical distance between a point in the aspheric curve and the optical axis, and y denotes an aspheric depth (i.e. a vertical distance between the point having a distance of x from the optical axis and a plane tangent to the vertex on the optical axis of the aspheric surface).

For convenience, an aspheric surface of each lens surface uses the aspheric surfaces shown in the above formula (7). However, the present disclosure is not limited to the aspherical polynomials form shown in the formula (7).

TABLE 3

| 2ω (°) | 194.9 |
|---|---|
| FNO | 1.83 |
| f (mm) | 2.899 |
| f1 (mm) | −22.881 |
| f2 (mm) | −66.441 |
| f3 (mm) | −6.155 |
| f4 (mm) | 9.177 |
| f5 (mm) | −10.025 |
| f6 (mm) | 5.516 |

TABLE 3-continued

| f7 (mm) | 28.821 |
|---|---|
| TTL (mm) | 32.006 |
| LB (mm) | 4.209 |
| IH (mm) | 4.032 |

In the subsequent Table 10, various parameters of Embodiments 1, 2 and 3 and values corresponding to the parameters specified in the above conditions (1) to (6) are shown.

As shown in Table 10, Embodiment 1 satisfies the conditions (1) to (6).

Figure 2:
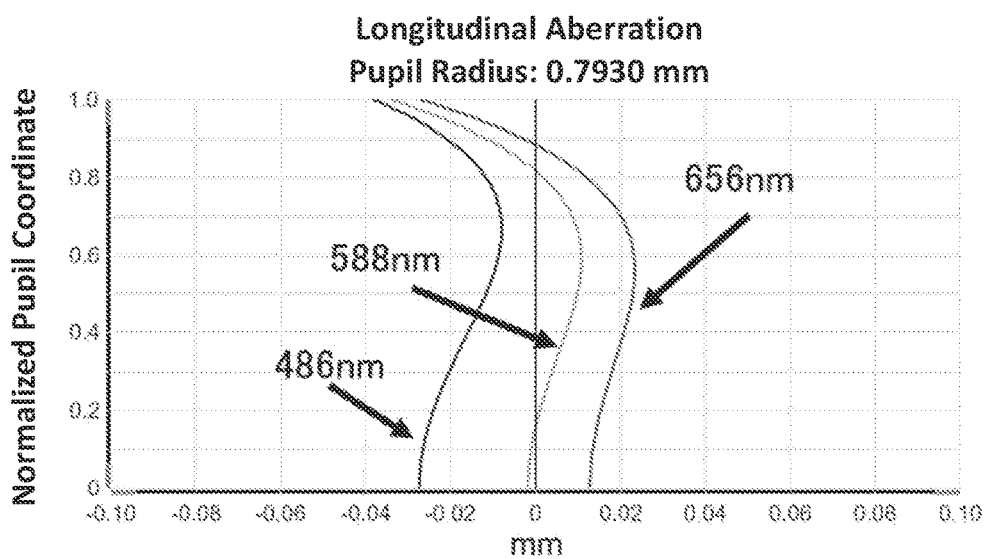
FIG. 2 is a schematic diagram of a longitudinal aberration of the camera optical lens LA according to Embodiment 1 of the present disclosure.
Figure 3:
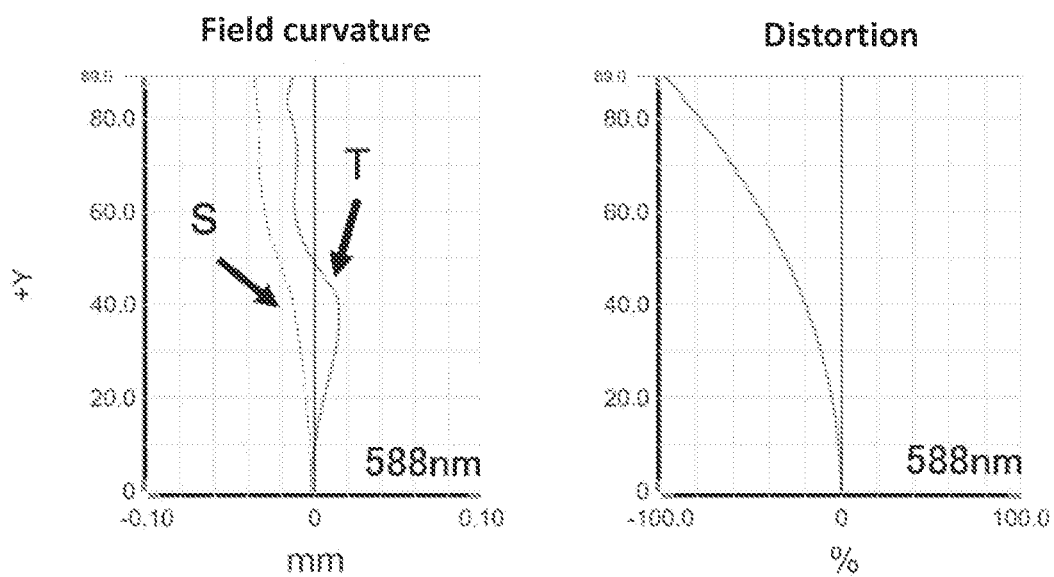
FIG. 3 is a schematic diagram of a field curvature and a distortion of the camera optical lens LA according to Embodiment 1 of the present disclosure.
Figure 4:
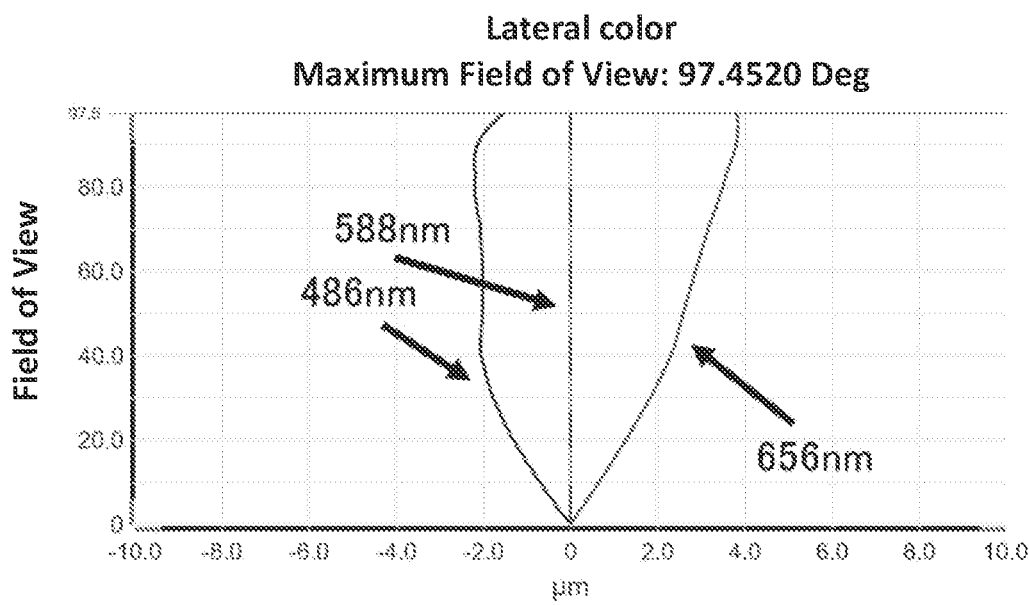
FIG. 4 is a schematic diagram of a lateral color of the camera optical lens LA according to Embodiment 1 of the present disclosure.

FIGS. 2 to 4 show a longitudinal aberration, a field curvature, a distortion and a lateral color of the camera optical lens LA according to Embodiment 1. FIG. 2 and FIG. 4 illustrates the longitudinal aberration and the lateral color of light with wavelengths of 486 nm, 588 nm and 656 nm after passing the camera optical lens LA, respectively. FIG. 4 illustrates a field curvature and a distortion with a wavelength of 588 nm after passing the camera optical lens LA. A field curvature S in the drawings is a field curvature in a sagittal direction, and T is a field curvature in a tangential direction, which are also the same in Embodiments 2 and 3. It can be seen that the camera optical lens LA of Embodiment 1 becomes bright when FNO=1.83 as shown in Table 3, and has good optical performance as shown in FIGS. 2 to 4.

Embodiment 2

Figure 5:
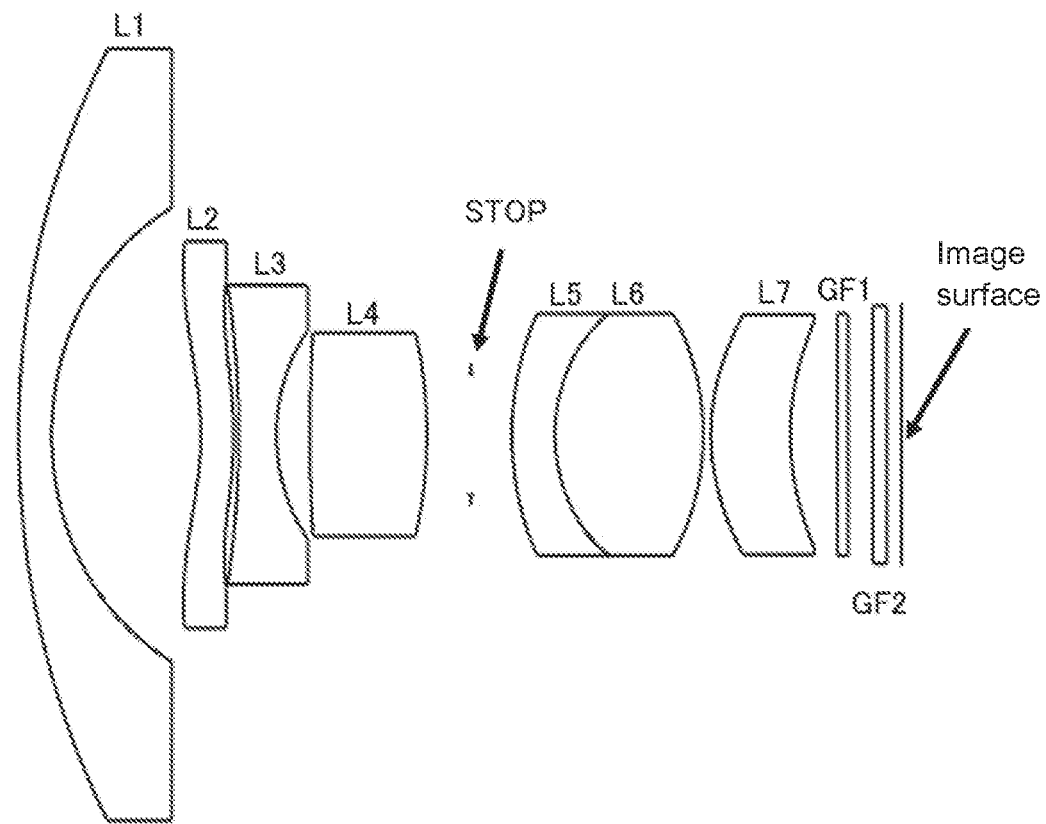
FIG. 5 is a schematic diagram of a structure of a camera optical lens LA according to Embodiment 2 of the present disclosure.

FIG. 5 is a schematic diagram of a structure of the camera optical lens LA according to Embodiment 2 of the present disclosure. Table 4 shows the central curvature radiuses R of the object-side surfaces and the image-side surfaces of the camera optical lens LA of the first lens L1 to the seventh lens L7, the on-axis thicknesses d of the lenses, the on-axis distances d between the lenses, the refractive indexes nd and the abbe numbers vd. Table 5 shows the conic coefficients k and the aspheric surface coefficients. Table 6 shows values of 2ω, Fno, f, f1, f2, f3, f4, f5, f6, f7, TTL, LB and IH.

TABLE 4

|  |  | R | d | nd | vd | Effective radius (mm) |
|---|---|---|---|---|---|---|
| S1 | R1 | 23.14014 | d1 1.200 | nd1 1.6510 | v1 56.24 | 11.780 |
| S2 | R2 | 7.69289 | d2 5.403 |  |  | 6.923 |
| S3 | R3 | −7.95251 | d3 1.193 | nd2 1.5831 | v2 59.37 | 5.914 |
| S4 | R4 | −9.32706 | d4 0.180 |  |  | 4.700 |
| S5 | R5 | −25.98132 | d5 1.367 | nd3 1.6180 | v3 63.32 | 4.579 |
| S6 | R6 | 5.00627 | d6 1.220 |  |  | 3.173 |
| S7 | R7 | 46.46123 | d7 4.237 | nd4 1.8081 | v4 22.76 | 3.100 |
| S8 | R8 | −11.65932 | d8 1.595 |  |  | 3.100 |
| STOP | STOP | ∞ | d9 1.485 |  |  | 1.856 |
| S9 | R9 | 7.92902 | d10 1.563 | nd5 1.9591 | v5 17.47 | 3.711 |
| S10 | R10 | 4.48000 | d11 5.370 | nd6 1.5952 | v6 67.74 | 2.296 |
| S11 | R11 | −6.70364 | d12 0.278 |  |  | 2.296 |
| S12 | R12 | 5.61157 | d13 2.881 | nd7 1.5831 | v7 59.37 | 3.659 |
| S13 | R13 | 7.20542 | d14 1.702 |  |  | 3.513 |
| S14 | R14 | ∞ | d15 0.400 | nd8 1.5168 | v8 64.20 | 3.664 |
| S15 | R15 | ∞ | d16 0.885 |  |  | 3.713 |
| S16 | R16 | ∞ | d17 0.500 | nd9 1.5168 | v9 64.20 | 3.874 |
| S17 | R17 | ∞ | d18 0.550 |  |  | 3.934 |

Reference wavelength = 588 nm

TABLE 5

| | Conic coefficient | Aspheric surface coefficients | | | |
|---|---|---|---|---|---|
| | k | A4 | A6 | A8 | A10 |
| R3 | 0.0000000E+00 | 2.4765340E−03 | −3.4792300E−05 | 2.9860600E−07 | 1.1223400E−09 |
| R4 | 0.0000000E+00 | 2.6303960E−03 | −2.7158800E−05 | 7.8263500E−08 | −1.3738500E−08 |
| R12 | 1.8899425E−01 | −8.1248600E−04 | −2.4852800E−05 | −1.0904900E−06 | −6.1016100E−09 |
| R13 | 1.3280726E+00 | −1.3104200E−05 | −4.9259200E−05 | −1.9444600E−06 | −1.0010000E−07 |

| | Conic coefficient | Aspheric surface coefficients | | |
|---|---|---|---|---|
| | k | A12 | A14 | A16 |
| R3 | 0.0000000E+00 | 1.4821300E−13 | 0.0000000E+00 | 0.0000000E+00 |
| R4 | 0.0000000E+00 | 5.8033800E−10 | 0.0000000E+00 | 0.0000000E+00 |
| R12 | 1.8899425E−01 | −1.1519200E−10 | 0.0000000E+00 | 0.0000000E+00 |
| R13 | 1.3280726E+00 | 5.6849300E−09 | 0.0000000E+00 | 0.0000000E+00 |

TABLE 6

| 2ω(°) | 194.8 |
|---|---|
| FNO | 1.83 |
| f (mm) | 2.715 |
| f1 (mm) | −18.203 |
| f2 (mm) | −135.743 |
| f3 (mm) | −6.660 |
| f4 (mm) | 11.831 |
| f5 (mm) | −13.681 |

TABLE 6-continued

| f6 (mm) | 5.484 |
|---|---|
| f7 (mm) | 26.015 |
| TTL (mm) | 32.009 |
| LB (mm) | 6.368 |
| IH (mm) | 4.032 |

As shown in Table 10, Embodiment 2 satisfies the conditions (1) to (6).

Figure 6:
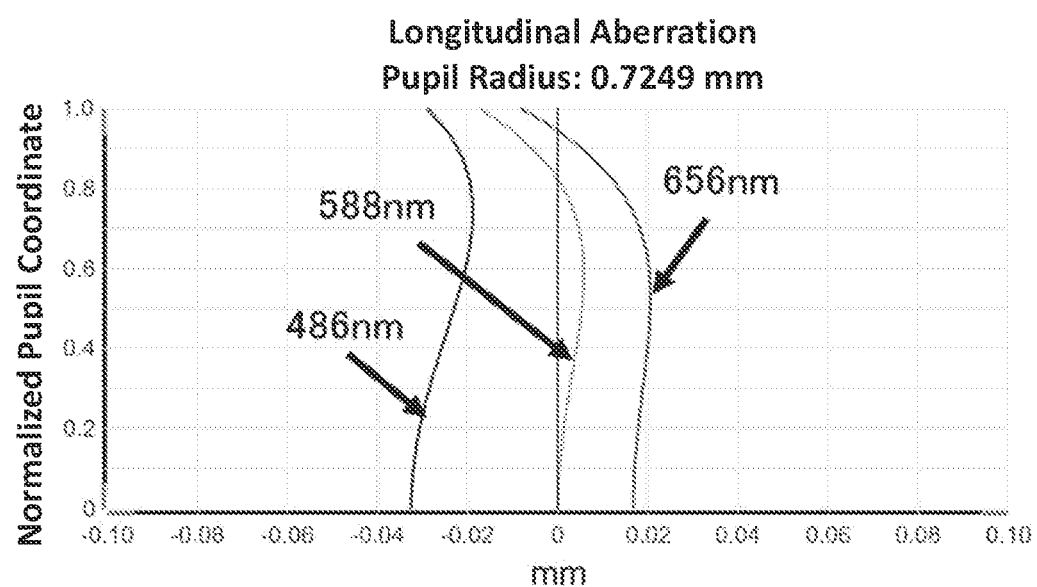
FIG. 6 is a schematic diagram of a longitudinal aberration of the camera optical lens LA according to Embodiment 2 of the present disclosure.
Figure 7:
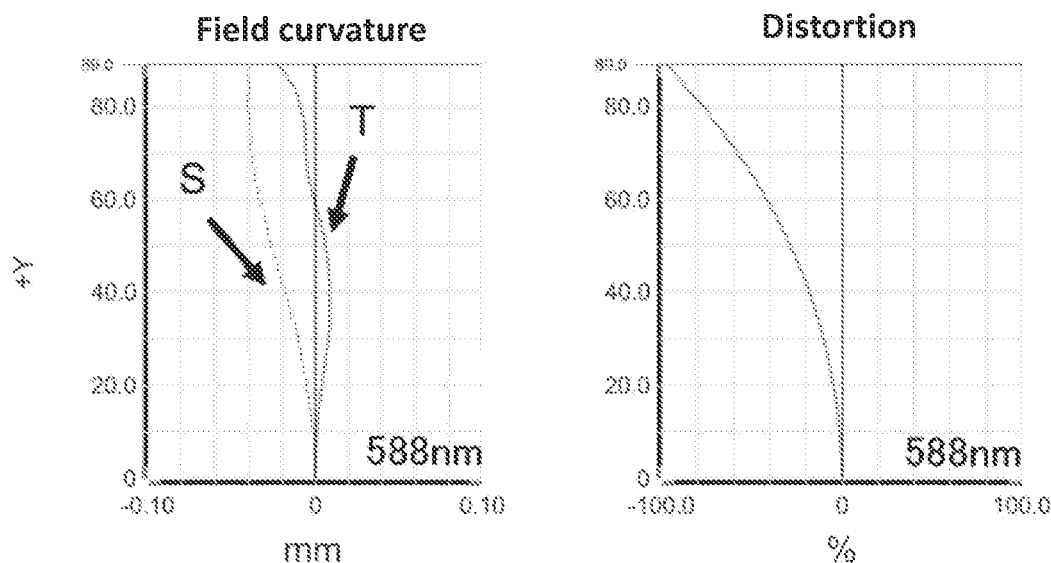
FIG. 7 is a schematic diagram of a field curvature and a distortion of the camera optical lens LA according to Embodiment 2 of the present disclosure.
Figure 8:
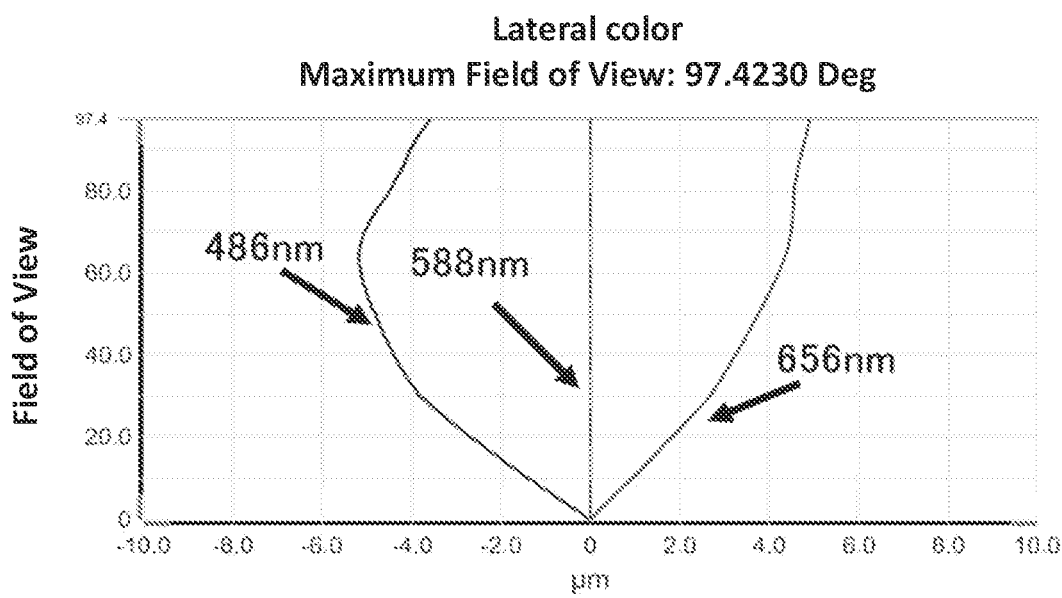
FIG. 8 is a schematic diagram of a lateral color of the camera optical lens LA according to Embodiment 2 of the present disclosure.

FIGS. 6 to 8 show a longitudinal aberration, a field curvature, a distortion and a lateral color of the camera optical lens LA according to Embodiment 2. FIG. 6 and FIG. 8 illustrates the longitudinal aberration and the lateral color of light with wavelengths of 486 nm, 588 nm and 656 nm after passing the camera optical lens LA, respectively. FIG. 7 illustrates a field curvature and a distortion with a wavelength of 588 nm after passing the camera optical lens LA. It can be seen that the camera optical lens LA of Embodiment 2 becomes bright when FNO=1.83 as shown in Table 6, and has good optical performance as shown in FIGS. 6 to 8.

Embodiment 3

Figure 9:
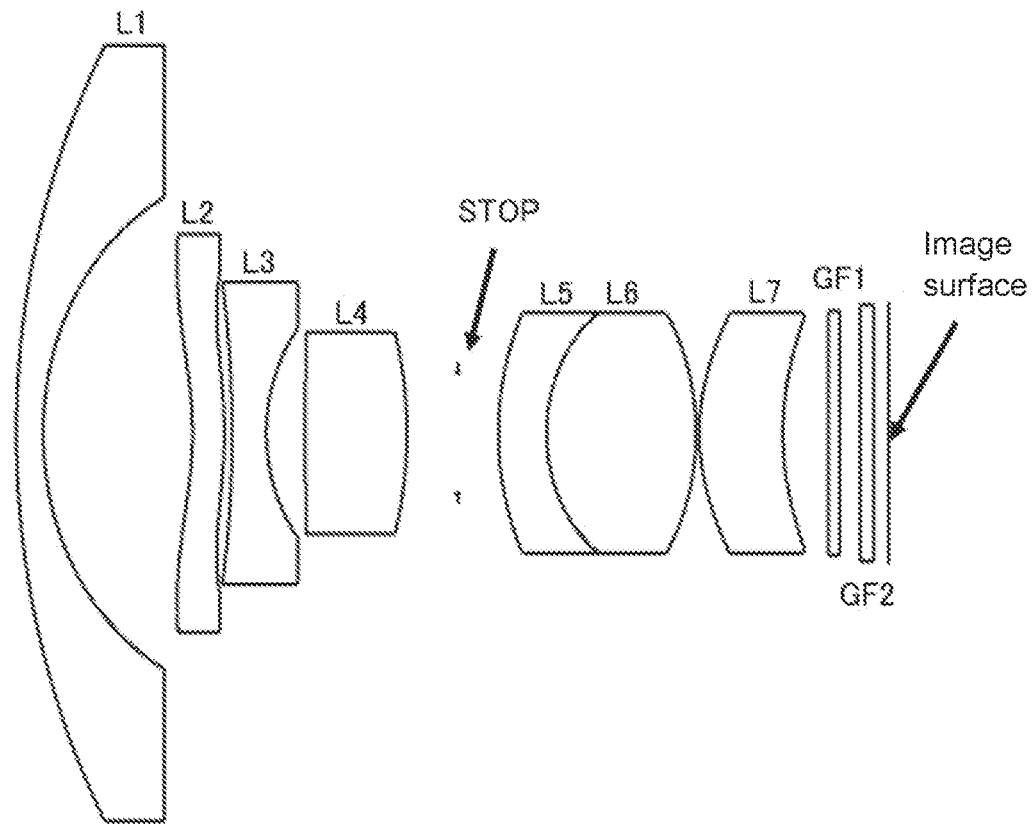
FIG. 9 is a schematic diagram of a structure of a camera optical lens LA according to Embodiment 3 of the present disclosure.

FIG. 9 is a schematic diagram of a structure of the camera optical lens LA according to Embodiment 3 of the present disclosure. Table 7 shows the central curvature radiuses R of the object-side surfaces and the image-side surfaces of the camera optical lens LA of the first lens L1 to the seventh lens L7, the on-axis thicknesses d of the lenses, the on-axis distances d between the lenses, the refractive indexes nd and the abbe numbers vd. Table 8 shows the conic coefficients k and the aspheric surface coefficients. Table 9 shows values of 2ω, Fno, f, f1, f2, f3, f4, f5, f6, f7, TTL, LB and IH.

Figure 10:
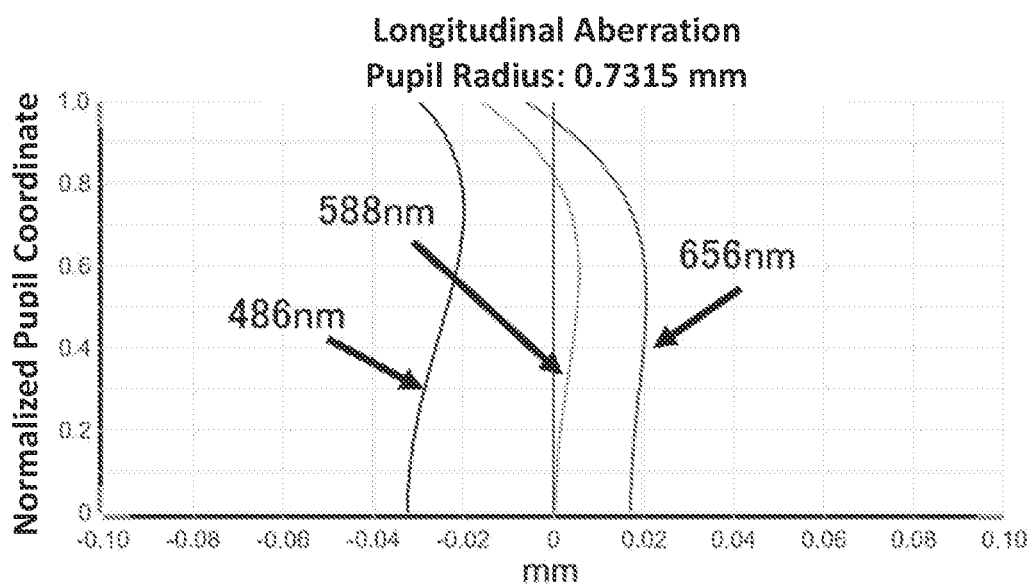
FIG. 10 is a schematic diagram of a longitudinal aberration of the camera optical lens LA according to Embodiment 3 of the present disclosure.
Figure 11:
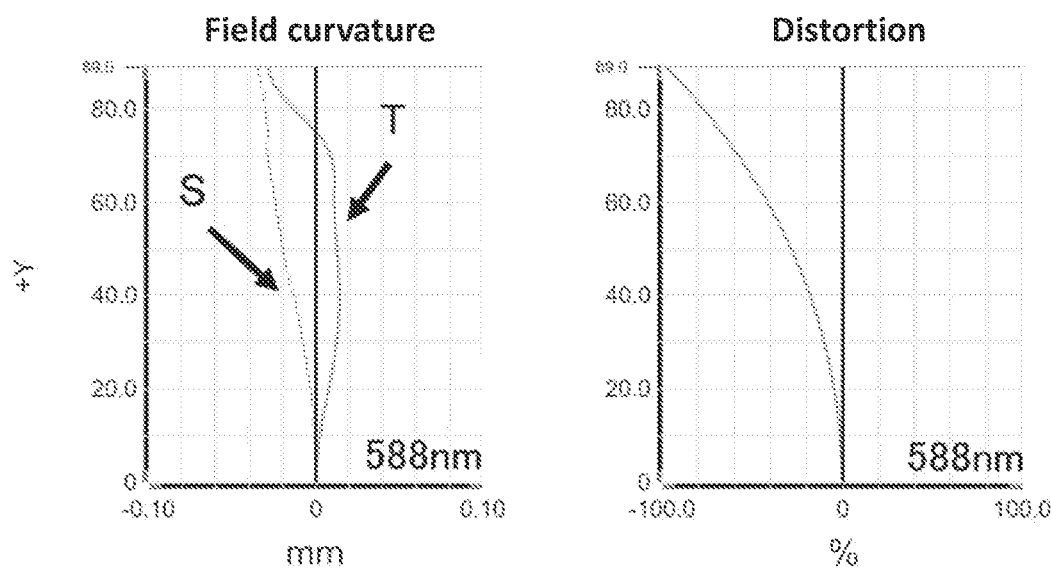
FIG. 11 is a schematic diagram of a field curvature and a distortion of the camera optical lens LA according to Embodiment 3 of the present disclosure.
Figure 12:
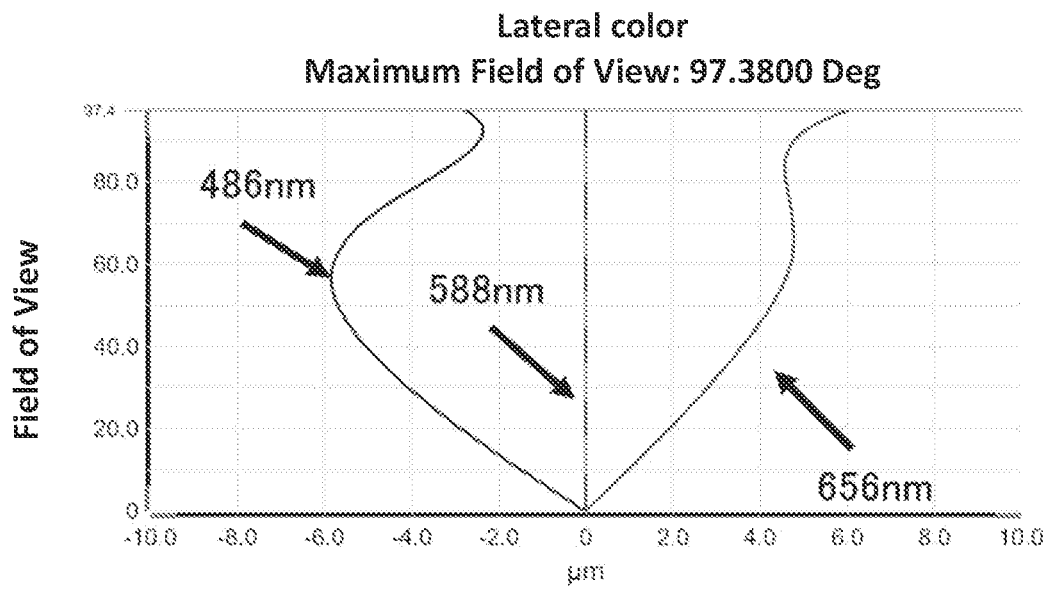
FIG. 12 is a schematic diagram of a lateral color of the camera optical lens LA according to Embodiment 3 of the present disclosure.

FIGS. 10 to 12 show a longitudinal aberration, a field curvature, a distortion and a lateral color of the camera optical lens LA according to Embodiment 3. FIG. 10 and FIG. 12 illustrates the longitudinal aberration and the lateral color of light with wavelengths of 486 nm, 588 nm and 656 nm after passing the camera optical lens LA, respectively. FIG. 11 illustrates a field curvature and a distortion with a wavelength of 588 nm after passing the camera optical lens LA. It can be seen that the camera optical lens LA of Embodiment 3 becomes bright when FNO=1.83 as shown in Table 9, and has good optical performance as shown in FIGS. 10 to 12.

TABLE 7

|  |  | R | d |  | nd |  | vd | Effective radius (mm) |
|---|---|---|---|---|---|---|---|---|
| S1 | R1 | 23.14014 | 1.000 | d1 | 1.6510 | nd1 | v1 56.24 | 12.108 |
| S2 | R2 | 8.08847 | 5.567 | d2 |  |  |  | 7.286 |
| S3 | R3 | −8.72203 | 1.186 | d3 | 1.5831 | nd2 | v2 59.37 | 6.197 |
| S4 | R4 | −10.73572 | 0.293 | d4 |  |  |  | 4.900 |
| S5 | R5 | −29.40532 | 1.274 | d5 | 1.6180 | nd3 | v3 63.32 | 4.675 |
| S6 | R6 | 4.98199 | 1.447 | d6 |  |  |  | 3.221 |
| S7 | R7 | 118.39558 | 3.791 | d7 | 1.8081 | nd4 | v4 22.76 | 3.100 |
| S8 | R8 | −10.91943 | 1.894 | d8 |  |  |  | 3.100 |
| STOP | STOP | ∞ | 1.516 | d9 |  |  |  | 1.845 |
| S9 | R9 | 8.02630 | 1.795 | d10 | 1.9591 | nd5 | v5 17.47 | 3.711 |
| S10 | R10 | 4.48000 | 5.571 | d11 | 1.5952 | nd6 | v6 67.74 | 2.286 |
| S11 | R11 | −6.70166 | 0.127 | d12 |  |  |  | 3.127 |
| S12 | R12 | 5.79762 | 3.111 | d13 | 1.5831 | nd7 | v7 59.37 | 3.733 |
| S13 | R13 | 7.83168 | 1.702 | d14 |  |  |  | 3.608 |
| S14 | R14 | ∞ | 0.400 | d15 | 1.5168 | nd8 | v8 64.20 | 3.770 |
| S15 | R15 | ∞ | 0.785 | d16 |  |  |  | 3.817 |
| S16 | R16 | ∞ | 0.500 | d17 | 1.5168 | nd9 | v9 64.20 | 3.959 |
| S17 | R17 | ∞ | 0.550 | d18 |  |  |  | 4.019 |

Reference wavelength = 588 nm

TABLE 8

| | Conic coefficient | Aspheric surface coefficients | | | |
|---|---|---|---|---|---|
| | k | A4 | A6 | A8 | A10 |
| R3 | 0.0000000E+00 | 2.3156276E−03 | −3.6344213E−05 | 2.8306112E−07 | 1.3077852E−09 |
| R4 | 0.0000000E+00 | 2.4638836E−03 | −3.2011495E−05 | 2.3595106E−07 | −2.0940165E−08 |
| R12 | 2.1829796E−01 | −8.2730871E−04 | −2.2275287E−05 | −9.6586968E−07 | −1.3710673E−08 |
| R13 | 1.9080438E+00 | −2.2884181E−04 | −6.3562126E−05 | −1.9807239E−07 | −1.6277323E−07 |

| | Conic coefficient | Aspheric surface coefficients | | |
|---|---|---|---|---|
| | k | A12 | A14 | A16 |
| R3 | 0.0000000E+00 | −1.3743541E−11 | 1.5218248E−13 | 0.0000000E+00 |
| R4 | 0.0000000E+00 | 3.4937713E−10 | 8.5215433E−12 | 0.0000000E+00 |
| R12 | 2.1829796E−01 | 3.7150559E−10 | 3.4637898E−11 | 0.0000000E+00 |
| R13 | 1.9080438E+00 | −1.0992431E−09 | 6.1481692E−10 | 0.0000000E+00 |

TABLE 9

| 2ω(°) | 194.8 |
|---|---|
| FNO | 1.83 |
| f (mm) | 2.673 |
| f1 (mm) | −19.553 |
| f2 (mm) | −101.577 |
| f3 (mm) | −6.778 |
| f4 (mm) | 12.439 |
| f5 (mm) | −13.936 |
| f6 (mm) | 5.528 |
| f7 (mm) | 24.393 |
| TTL (mm) | 32.509 |
| LB (mm) | 6.498 |
| IH (mm) | 4.032 |

As shown in Table 10, Embodiment 3 satisfies the conditions (1) to (6).

TABLE 10

|  | Embodiment 1 | Embodiment 2 | Embodiment 3 |
|---|---|---|---|
| Condition (1) | −22.919 | −50.000 | −37.998 |
| Condition (2) | 9.290 | 29.999 | 19.018 |
| Condition (3) | −10.783 | −9.570 | −11.000 |
| Condition (4) | −109.066 | −753.635 | −347.016 |
| Condition (5) | 4.695 | 14.554 | 9.462 |
| Condition (6) | −12.046 | −24.754 | −18.374 |

It will be understood by those of ordinary skill in the art that the embodiments described above are specific embodiments realizing the present disclosure, and that in practical applications, various changes may be made thereto in form and in detail without departing from the range and scope of the disclosure.

What is claimed is:

1. A camera optical lens comprising, from an object side to an image side in sequence, a first lens having negative refractive power, a second lens having negative refractive power, a third lens having negative refractive power, a fourth lens having positive refractive power, a fifth lens having negative refractive power, a sixth lens having positive refractive power and a seventh lens having positive refractive power; wherein the camera optical lens satisfies conditions of:

$-50.10 \leq f2/f \leq -22.90;$ $9.20 \leq d2/d4 \leq 30.00;$ and $-11.10 \leq R5/f \leq -9.55;$ where f denotes a focal length of the camera optical lens;

f2 denotes a focal length of the second lens;

R5 denotes a central curvature radius of an object-side surface of the third lens;

d2 denotes an on-axis distance from an image-side surface of the first lens to an object-side surface of the second lens; and d4 denotes an on-axis distance from the image-side surface of the second lens to the object-side surface of the third lens.

2. The camera optical lens according to claim 1, wherein the camera optical lens further satisfies a condition of:

$-753.70 \leq f2/d4 \leq -109.00.$

3. The camera optical lens according to claim 1, wherein the camera optical lens further satisfies a condition of:

$4.60 \leq f2/R4 \leq 14.60;$ where

R4 denotes a central curvature radius of an image-side surface of the second lens.

4. The camera optical lens according to claim 1, wherein the camera optical lens further satisfies a condition of:

$-25.00 \leq f2/f6 \leq -12.00;$ where f6 denotes a focal length of the sixth lens.

5. The camera optical lens according to claim 1, wherein the first lens, the second lens, the third lens, the fourth lens, the fifth lens, the sixth lens and the seventh lens having positive refractive power are made from glass material.

6. The camera optical lens according to claim 1, wherein each of the second lens and the seventh lens is an aspheric glass lens.

* * * * *